UNITED STATES PATENT OFFICE.

AUGUST BLANK, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

TRISAZO DYE.

1,051,859.   Specification of Letters Patent.   Patented Feb. 4, 1913.

No Drawing.   Application filed June 1, 1911.   Serial No. 630,646.

*To all whom it may concern:*

Be it known that I, AUGUST BLANK, doctor of philosophy, chemist, citizen of the German Empire, residing at Leverkusen, near Cologne, Germany, have invented new and useful Improvements in Trisazo Dye, of which the following is a specification.

The present invention relates to the manufacture and production of new azo dyestuffs which are obtained by combining the diazo compounds prepared from amino sulfonic acids, *e. g.* sulfanilic acid, etc., with an amin of the benzene series having a free para position to the amino group, rediazotizing the aminoazo compounds thus obtained, combining the diazoazo compounds with a second molecule of the same or another of such an amin, such as anilin, toluidins, xylidin, aminophenol ethers, cresidin, rediazotizing the aminodisazo compounds and combining the diazo compounds with an azo dyestuff component such as nitrophenylenediamin, nitrotoluylenediamin. One molecule of the two middle components can also be 1-naphthylamin or its sulfonic acids. Orange to blue-red cotton dyestuffs are thus obtained; they are after being dried and pulverized dark powders soluble in water generally with a brown to blue coloration. Upon treatment with stannous chlorid and hydrochloric acid they are split up, an amino sulfonic acid, a diamin and an amin are obtained.

The new dyestuffs of the present invention have the following general formula:

$$R-N=N-R_1-N=N-R_2-N=N-R_3'$$

where R, $R_1$, and $R_2$ are the aromatic nuclei or radicals, respectively of the various components used in forming the dyestuffs and $R_3$ the radical or nucleus of the aromatic nitro-diamin used as end component.

In order to illustrate the new process more fully the following example is given, the parts being by weight: 347 parts of the sodium salt of 2-naphthylamin-3.6-disulfonic acid are diazotized at about 15–20° C. with 69 parts of sodium nitrite. The diazo solution is combined with a solution of 107 parts of meta-toluidin in water containing 150 parts of hydrochloric acid, 130 parts of sodium acetate are slowly added. The mixture is then neutralized with sodium carbonate, caustic soda lye is added to prepare the sodium salt of the dye, 69 parts of sodium nitrite are added and then it is diazotized by adding at 10–15° C. 450 parts of hydrochloric acid. The diazotization is complete after stirring for 3 to 4 hours and the resulting diazo compound is then again combined in the same manner with 107 parts of meta-toluidin. The second intermediate product is then dissolved by the addition of NaOH and water. After filtration 69 parts of sodium nitrite are added and finally after cooling to zero sufficient hydrochloric acid to produce diazotization. The diazodisazo compound which separates is filtered off, mixed with water and added to an aqueous solution cooled to 0° C. of 150 parts of nitro-meta-phenylenediamin containing 150 parts of hydrochloric acid. Sodium acetate and sodium carbonate are added, the mixture is rendered alkaline and the dye is then isolated in the usual manner. It is after being dried and pulverized a dark powder having most probably the following formula:

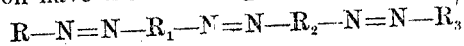
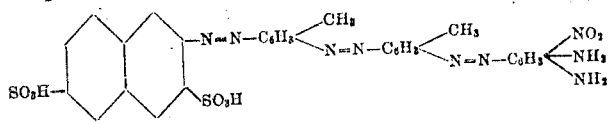

soluble in water with a brown coloration and yielding upon reduction with stannous chlorid and hydrochloric acid 2-naphthylamin-3.6-disulfonic acid, diaminomethylbenzene and tetraaminobenzene. It dyes cotton in orange shades fast to light. 2-naphthylamin-4.8-disulfonic acid, sulfanilic acid and anilin, etc., can be used as first component.

We claim:

1. The new trisazo dyestuffs of the following general formula:

$$R-N=N-R_1-N=N-R_2-N=N-R_3$$

where R, $R_1$ and $R_2$ are aromatic radicals, and where at least one of the middle components is of the benzene series, and $R_3$ the radical of an aromatic nitro-diamin, which dyestuffs are after being dried and pulverized dark powders soluble in water generally with a brown to blue coloration, and dyeing cotton orange to blue red shades fast to light, substantially as described.

2. The new trisazo dyestuffs of the following general formula:

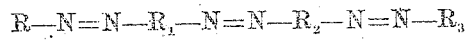

where R is the radical of an aromatic sulfonic acid, $R_1$ and $R_2$ the radicals of aromatic middle components of which at least one must be of the benzene series, and $R_3$ the radical of an aromatic nitro-diamin, which dyestuffs are after being dried and pulverized dark powders soluble in water generally with a brown to blue coloration, and dyeing cotton orange to blue red shades fast to light, substantially as described.

3. The new trisazo dyestuffs of the following general formula:

$R-N=N-R_1-N=N-R_2-N=N-R_3$ where R is the radical of a sulfonic acid of

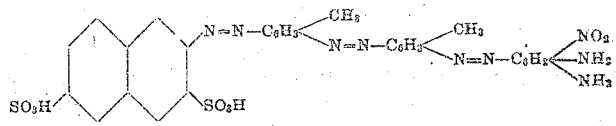

which dyestuffs are after being dried and pulverized dark powders soluble in water generally with a brown coloration, and dyeing cotton orange brown shades fast to light, substantially as described.

the naphthalene series, $R_1$ and $R_2$ aromatic radicals of which at least one is of the benzene series, and $R_3$ the radical of an aromatic nitro-diamin, which dyestuffs are after being dried and pulverized dark powders soluble in water generally with a brown to blue coloration and dyeing cotton orange to blue-red shades fast to light, substantially as described.

4. The new trisazo dyestuffs of the following general formula:

$R-N=N-R_1-N=N-R_2-N=N-R_3$ where R is the radical of a sulfonic acid of the naphthalene series, $R_1$ and $R_2$ aromatic radicals of the benzene series, and $R_3$ the radical of an aromatic nitro-diamin, which dyestuffs are after being dried and pulverized dark powders soluble in water generally with a brown coloration, and dyeing cotton orange brown shades fast to light, substantially as described.

5. The new trisazo dyestuffs of the following formula:

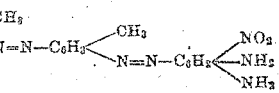

6. The herein described new tertiary trisazo dyestuff containing two molecules of meta-toluidin as middle components, which dyestuff having most probably the formula:

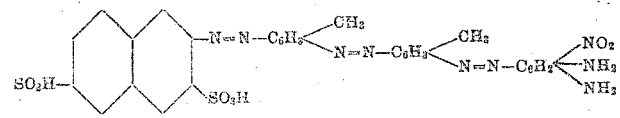

is after being dried and pulverized a dark powder soluble in water with a brown coloration; yielding upon reduction with stannous chlorid and hydrochloric acid 2-naphthylamin-3.6-disulfonic acid, diaminotoluene and tetraaminobenzene; dyeing cotton in orange shades fast to light, substantially as described.

In testimony whereof I have hereunto set my hand in the presence of two subscribing witnesses.

AUGUST BLANK. [L. S.]

Witnesses:
ALBERT F. NUFER,
ALFRED HENKEL.